US012498314B2

(12) United States Patent
Zhu et al.

(10) Patent No.: US 12,498,314 B2
(45) Date of Patent: Dec. 16, 2025

(54) METHOD AND APPARATUS FOR MICROPLASTIC IDENTIFICATION WITH POLARIZED DIGITAL HOLOGRAPHY

(71) Applicant: The University of Hong Kong, Hong Kong (HK)

(72) Inventors: Yanmin Zhu, Hong Kong (HK); Yuxing Li, Hong Kong (HK); Yin Mun Edmund Lam, Hong Kong (HK)

(73) Assignee: The University of Hong Kong, Hong Kong (HK)

( * ) Notice: Subject to any disclaimer, the term of this patent is extended or adjusted under 35 U.S.C. 154(b) by 139 days.

(21) Appl. No.: 18/610,304

(22) Filed: Mar. 20, 2024

(65) Prior Publication Data

US 2024/0328928 A1 Oct. 3, 2024

Related U.S. Application Data

(60) Provisional application No. 63/492,763, filed on Mar. 28, 2023.

(51) Int. Cl.
*G01N 21/21* (2006.01)
*G03H 1/00* (2006.01)
(Continued)

(52) U.S. Cl.
CPC .......... *G01N 21/21* (2013.01); *G03H 1/0005* (2013.01); *G03H 1/0443* (2013.01);
(Continued)

(58) Field of Classification Search
CPC ......... G01N 21/453; G01N 2201/0218; G01N 2223/623
See application file for complete search history.

(56) References Cited

U.S. PATENT DOCUMENTS 9,810,894 B2    11/2017  Grier et al.
2007/0216906 A1  9/2007  Javidi et al.
(Continued)

FOREIGN PATENT DOCUMENTS

CN        103279024 A    9/2013

OTHER PUBLICATIONS

Noah L. Walcutt et al., "Assessment of holographic microscopy for quantifying marine particle size and concentration," Limnology and Oceanography: Methods, Aslo, 2020, vol. 18, p. 516-530.
(Continued)

*Primary Examiner* — Frank Johnson
(74) *Attorney, Agent, or Firm* — IDEA Intellectual Limited; Sam T. Yip (57) ABSTRACT

A method for aquatic microplastic identification is provided. The method includes steps as follows: emitting a laser beam from a laser source, such that the laser beam passes through a liquid sample with MP samples in a sample channel and then a polarizer and is received by polarization camera; capturing a sample image of the MP samples by the polarization camera, wherein the sample image comprises interference patterns resulting from superposition of object and reference waves; and feeding the interference patterns into a morphology analyzing module for real-time tracking and analyzing by using a lightweight convolutional neural network (CNN) model, so as to classify the MP samples.

20 Claims, 8 Drawing Sheets

(51) Int. Cl.
  *G03H 1/04*      (2006.01)
  *G06V 10/147*    (2022.01)
  *G06V 10/34*     (2022.01)
  *G06V 10/764*    (2022.01)
  *G06V 10/82*     (2022.01)
  *H04N 23/55*     (2023.01)

(52) U.S. Cl.
  CPC ............ *G06V 10/147* (2022.01); *G06V 10/34* (2022.01); *G06V 10/764* (2022.01); *G06V 10/82* (2022.01); *H04N 23/55* (2023.01); *G01N 2201/06113* (2013.01); *G01N 2201/068* (2013.01); *G03H 2001/0033* (2013.01); *G03H 2210/55* (2013.01); *G03H 2223/15* (2013.01); *G03H 2223/20* (2013.01); *G03H 2223/22* (2013.01)

(56) References Cited

U.S. PATENT DOCUMENTS

| | | |
|---|---|---|
| 2021/0209337 A1 | 7/2021 | Ozcan et al. |
| 2022/0136940 A1* | 5/2022 | Liu ........................... G01N 1/10 73/61.72 |
| 2022/0306488 A1* | 9/2022 | Gutierrez ................ G01N 15/06 |
| 2024/0027324 A1* | 1/2024 | Hong ................. G01N 15/1484 |
| 2024/0071072 A1* | 2/2024 | LaBine ................. G06V 10/764 |
| 2024/0124325 A1* | 4/2024 | Swanson ................ G06V 20/05 |
| 2024/0192119 A1* | 6/2024 | Ariya ................. G01N 15/1434 |
| 2025/0020569 A1* | 1/2025 | Prater ................. G01N 15/1434 |
| 2025/0130159 A1* | 4/2025 | Pinrod ................... G01N 21/21 |
| 2025/0231115 A1* | 7/2025 | Oser .................... G01N 33/442 |

OTHER PUBLICATIONS

Alex Ramirez et al., "Design of a Low-cost, Submersible, Digital Holographic Microscope for in Situ Microbial Imaging," 2022 IEEE Aerospace Conference (AERO), 2022, p. 1-7.

Darian Mcbain, "What is the blue economy?," LSE, May 16, 2023, p. 1-5 URL: https://www.lse.ac.uk/granthaminstitute/explainers/what-is-the-blue-economy/#:~:text=The%20blue%20economy%20is%20estimated,to%20over%20three%20billion%20people.

Timothy J.K. Ng et al., "Snapp: An Agile Robotic Fish With 3-D Maneuverability for Open Water Swim," IEEE Robotics and Automation Letters, 2023, p. 1-8.

Zeynep Akdogan et al., "Microplastics in the environment: A critical review of current understanding and identification of future research needs," Environmental Pollution, 2019, vol. 254, 113011, p. 1-24.

Richard C. Thompson et al., "Lost at Sea: Where Is All the Plastic?," Science, 2004, vol. 304, p. 838.

Albert A. Koelmans et al., "Risk assessment of microplastic particles," Nature Reviews Materials, 2022, vol. 7, p. 138-152.

Matthias C. Rillig et al., "Microplastic in terrestrial ecosystems," Science, 2020, vol. 368, Issue 6498, p. 1-4.

Shivika Sharma et al., "Microplastic pollution, a threat to marine ecosystem and human health: A short review," Environ Sci Pollut Res, 2017, vol. 24, p. 21530-21547.

A. Dick Vethaak et al., "Microplastics and human health," Science, vol. 371, Issue 6530, p. 672-674.

Vasiliki Kinigopoulou et al., "Microplastics as carriers of inorganic and organic contaminants in the environment: A review of recent progress," Journal of Molecular Liquids, 2022, vol. 350, 118580, p. 1-10.

Hongwei Luo et al., "Environmental behaviors of microplastics in aquatic systems: A systematic review on degradation, adsorption, toxicity and biofilm under aging conditions," Journal of Hazardous Materials, 2022, vol. 423, 126915, p. 1-16.

Cheuk-Fai Chow et al., "Chapter 8—Plastic Waste Problem and Education for Plastic Waste Management," Emerging Practices in Scholarship of Learning and Teaching in a Digital Era, 2017, p. 125-140.

Sun-Kyoung Shin et al., "New Policy Framework with Plastic Waste Control Plan for Effective Plastic Waste Management," Sustainability, 2020, vol. 12, 6049, p. 1-13.

Win Cowger et al., "Critical Review of Processing and Classification Techniques for Images and Spectra in Microplastic Research," Applied Spectroscpy, 2020, vol. 74, Issue 9, p. 989-1010.

Darena Schymanski et al., "Analysis of microplastics in water by micro-Raman spectroscopy: Release of plastic particles from different packaging into mineral water," Water Research, 2018, vol. 129, p. 154-162.

A. Baruah et al., "An insight into different microplastic detection methods," International Journal of Environmental Science and Technology, Springer, 2021.

Stefania Mariano et al., "Micro and Nanoplastics Identification: Classic Methods and Innovative Detection Techniques," Frontiers in Toxicology, 2021, vol. 3, Article 636640, p. 1-17.

Jiajin Li et al., "Recognition of microplastics suspended in seawater via refractive index by Mueller matrix polarimetry," Marine Pollution Bulletin, 2023, vol. 188, 114706, p. 1-13.

Won Joon Shim et al., "Identification and quantification of microplastics using nile red staining," Marine Pollution Bulletin, 2016, vol. 113, p. 469-476.

Arunkumar Priya et al., "Removing microplastics from wastewater using leading-edge treatment technologies: A solution to microplastic pollution—a review," Bioprocess and Biosystems Engineering, 2023, vol. 46, p. 309-321.

Wanyi Fu et al., "Separation, characterization and identification of microplastics and nanoplastics in the environment," Science of the Total Environment, 2020, vol. 721, 137561, p. 1-26.

Zhenbo Ren et al., "End-to-end deep learning framework for digital holographic reconstruction," Advanced Photonics, 2019, vol. 1, Issue 1, 016004.

Yanmin Zhu et al., "Digital holographic imaging and classification of microplastics using deep transfer learning," Applied Optics, 2021, vol. 60, No. 4, p. A38-A47.

Yanmin Zhu et al., "Holographic Classifier: Deep Learning in Digital Holography for Automatic Micro-objects Classification," 2020 IEEE 18th International Conference on Industrial Informatics (INDIN), 2020, p. 515-520.

Joseph W. Goodman, "Introduction to Fourier Optics," W. H. Freeman, Macmillan Learning, 2017, Fourth Edition.

Zhe Wang et al., "Digital holography as metrology tool at micro-nanoscale for soft matter," Light: Advanced Manufacturing, Official journal of the JHL, 2022, vol. 3, Issue 1, p. 151-176.

F. Merola et al., "Searching and identifying microplastics in marine environment by digital holography," The European Physical Journal Plus, 2018, vol. 133, Article 350, p. 1-6.

Benjamin O. Asamoah et al., "Towards the Development of Portable and In Situ Optical Devices for Detection of Micro-and Nanoplastics in Water: A Review on the Current Status," Polymers, 2021, vol. 13, 730, p. 1-28.

Lena Schnitzler et al., "Lensless digital holographic microscopy as an efficient method to monitor enzymatic plastic degradation," Marine Pollution Bulletin, 2021, vol. 163, 111950, p. 1-12.

Marika Valentino et al., "Intelligent polarization-sensitive holographic flow-cytometer: Towards specificity in classifying natural and microplastic fibers," Science of the Total Environment, 2022, vol. 815, 152708, p. 1-12.

Yanmin Zhu et al., "Microplastic pollution monitoring with holographic classification and deep learning," Journal of Physics: Photonics, 2021, vol. 3, 024013, p. 1-12.

Yang Yang et al., "Polarization holographic microscope slide for birefringence imaging of anisotropic samples in microfluidics," Optics Express, 2020, vol. 28, No. 10, p. 14762-14773.

Jinyu Wang et al., "Linear polarization holography," Opto-Electronic Science, 2022, vol. 1, No. 2, 210009.

Jianqing Huang et al., "Snapshot Polarization-Sensitive Holography for Detecting Microplastics in Turbid Water," ACS Photonics, 2023, vol. 10, p. 4483-4493.

Yanmin Zhu et al., "Smart polarization and spectroscopic holography for real-time microplastics identification," Communications Engineering, 2024, vol. 3, Article 32, p. 1-8.

(56) References Cited

OTHER PUBLICATIONS

Yanmin Zhu et al., "Holographic and polarization features analysis for microplastics characterization and water monitoring," Multimodal Sensing and Artificial Intelligence: Technologies and Applications III, Proc. of SPIE, 2023, vol. 12621, 126210X.

Yuxing Li et al., "Polarization Holographic Imaging for High-throughput Microplastic Analysis," Optica Imaging Congress (3D, COSI, DH, FLatOptics, IS, pcAOP), Optica Publishing Group, 2023, Paper HM1D.6.

Ka Shing Lee et al., "U-net skip-connection architectures for the automated counting of microplastics," Neural Computing and Applications, 2022, vol. 34, p. 7283-7297.

Javier Lorenzo-Navarro et al., "Deep Learning Approach for Automatic Microplastics Counting and Classification," Science of the Total Environment, 2021, vol. 765, 142728.

Josef Brandt et al., "Deep Learning for Reconstructing Low-Quality FTIR and Raman Spectra—A Case Study in Microplastic Analyses," Analytical chemistry, 2021, vol. 93, p. 16360-16368.

Yanmin Zhu et al., "Digital Holography with Deep Learning and Generative Adversarial Networks for Automatic Microplastics Classification," Holography, Diffractive Optics, and Applications X, Proc. of SPIE, 2020, vol. 11551, 115510A.

Tianjiao Zeng et al., "Deep learning for digital holography: a review," Optics Express, 2021, vol. 29, No. 24, p. 40572-40593.

Yanmin Zhu et al., "Microplastic pollution assessment with digital holography and zero-shot learning," APL Photonics, 2022, vol. 7, 076102.

Teresa Cacace et al., "Compact holographic microscope for imaging flowing microplastics," 2021 International Workshop on Metrology for the Sea; Learning to Measure Sea Health Parameters (MetroSea), IEEE, 2021, p. 229-233.

Julia A. Prume et al., "From sieve to microscope: an efficient technique for sample transfer in the process of microplastics' quantification," MethodsX, 2021, vol. 8, 101341, p. 1-7.

Yanmin Zhu et al., "Full scene underwater imaging with polarization and an untrained network," Optics Express, 2021, vol. 29, No. 25, p. 41865-41881.

Yukitoshi Otani et al., "Imaging microplastics consumed by water organisms using a full-stokes polarization camera," Biomedical Imaging and Sensing Conference 2021, Proc. of SPIE, 2021, vol. 11925, 119250V.

Iurii E. Shishkin et al., "Implementation of YOLOv5 for Detection and Classification of Microplastics and Microorganisms in Marine Environment," 2023 International Russian Smart Industry Conference (SmartIndustryCon), IEEE, 2023, p. 230-235.

Glenn Jocher et al., "ultralytics/yolov5: v7.0-YOLOv5 SOTA Realtime Instance Segmentation,"Nov. 2022, Version 7.0 URL: https://zenodo.org/records/7347926.

Yunhao Du et al., "StrongSORT: Make DeepSORT Great Again," IEEE Transactions on Multimedia, 2023, p. 1-15.

Paul A. Helm, "Improving microplastics source apportionment: A role for microplastic morphology and taxonomy?," Analytical Methods, The Royal Society of Chemistry, 2017.

Yuxing Li et al., "Quantitative X-ray tomographic analysis reveals calcium precipitation in cataractogenesis," Scientific Reports, 2021, vol. 11, Article 17401, p. 1-9.

J Martin Bland et al., "Comparing methods of measurement: why plotting difference against standard method is misleading," The Lancet, 1995, vol. 346, p. 1085-1087.

Federica Pizzurro et al., "Accumulation Evaluation of Potential Microplastic Particles in Mytilus galloprovincialis from the *Goro Sacca* (Adriatic Sea, Italy)," Microplastics, 2022, vol. 1, p. 303-318.

James Kar-Hei Fang et al., "Adverse impacts of high-density microplastics on juvenile growth and behaviour of the endangered tri-spine horseshoe crab *Tachypleus tridentatus*," Marine Pollution Bulletin, 2023, vol. 187, 114535, p. 1-8.

Edoardo Severini et al., "River-Groundwater Interaction and Recharge Effects on Microplastics Contamination of Groundwater in Confined Alluvial Aquifers," Water, 2022, vol. 14, 1913, p. 1-16.

Hans Mueller, "Theory of Photo elasticity in Amorphous Solids," Physics, A Journal of General and Applied Physics, 1935, vol. 6, No. 6, p. 179-184.

Nina Hong et al., "Mueller matrix characterization of flexible plastic substrates," Applied Surface Science, 2017, vol. 421, p. 518-528.

W. Siebourg et al., "Birefringence—An Important Property of Plastic Substrates for Magneto-Optical Storage Disks," Polymer Engineering and Science, 1990, vol. 30, No. 18, p. 1133-1139.

Young Kyoung Song et al., "A comparison of microscopic and spectroscopic identification methods for analysis of microplastics in environmental samples," Marine Pollution Bulletin, 2015, vol. 93, p. 202-209.

Zhong-Min Wang et al., "SEM/EDS and optical microscopy analyses of microplastics in ocean trawl and fish guts," Science of the Total Environment, 2017, vol. 603-604, p. 616-626.

Matthew Ming-Lok Leung et al., "Improved Raman spectroscopy-based approach to assess microplastics in seafood," Environmental Pollution, 2021, vol. 289, 117648, p. 1-11.

Christian Tötzke et al., "Non-invasive detection and localization of microplastic particles in a sandy sediment by complementary neutron and X-ray tomography," Journal of Soils and Sediments, 2021, vol. 21, p. 1476-1487.

Harry Nelson et al., "Use of Imaging Flow Cytometry (FlowCam®) in the Study of Microplastics," 2018 Ocean Sciences Meeting, 2018.

Madelyn N. Woods et al., "Microplastic fiber uptake, ingestion, and egestion rates in the blue mussel (*Mytilus edulis*)," Marine Pollution Bulletin, 2018, vol. 137, p. 638-645.

Haoxiang Li et al., "Underwater active polarization descattering based on a single polarized image," Optics Express, 2023, vol. 31, No. 13, p. 21988-22000.

Yi Wei et al., "Estimation and removal of backscattered light with nonuniform polarization information in underwater environments," Optics Express, 2022, vol. 30, No. 22, p. 40208-40220.

Yunping Zhang et al., "Photon-starved snapshot holography," APL Photonics, 2023, Vol. 8, 056106.

* cited by examiner

METHOD AND APPARATUS FOR MICROPLASTIC IDENTIFICATION WITH POLARIZED DIGITAL HOLOGRAPHY

CROSS-REFERENCE TO RELATED APPLICATIONS

The present application claims priority to provisional U.S. Patent Application No. 63/492,763 filed Mar. 28, 2023, the disclosure of which is incorporated by reference herein.

FIELD OF THE INVENTION

The present invention generally relates to polarized digital holography. More specifically, the present invention relates to methods and apparatuses for microplastic identification using polarized digital holography.

BACKGROUND OF THE INVENTION

Microplastics are small plastic particles that have become a major environmental concern in recent years. They can enter the environment through a variety of sources. Identifying and quantifying microplastics is critical in understanding the scale and scope of the problem and developing effective strategies to address it. However, the small size and diverse range of microplastics make their identification and quantification challenging.

To address the problem of marine pollution, the amphibious digital holographic apparatus is a compact and portable in-line device, which is capable of detecting microplastic samples of varied sizes in different environments. Both from the hardware and software aspects, the apparatus is expected to show a step forward to achieve high-resolution imaging and high-accuracy identification/classification.

However, the unstable background environment may have the identification provided by the apparatus difficult. For example, the image quality of microplastics detection in aqueous phase is relatively low, due to the scattering of light in imaging. Further, high throughput classification and automatic monitoring of microplastics in both airborne and aquatic environment is difficult.

Currently, conventional holographic apparatuses may not be suitable for the desired detection conditions. Some existing holographic apparatuses require a large number of additional optical components, such as mirrors or microscope objectives, which can complicate their configuration. Integrating different functional components, such as power, processor units, and waterproof enclosures, can also be challenging and is necessary to support the functions of a portable, real-time apparatus in the field. Additionally, underwater performance must be considered since a holographic apparatus designed to target microplastics in underwater scenarios requires enclosed housing components to support its submersible ability.

Therefore, there is a need to improve the performance of digital holographic apparatuses for Microplastics with a quick and simple approach.

SUMMARY OF THE INVENTION

In the present disclosure, it is to provide a novel approach to assess microplastic (MP) morphology parameters and material types based on polarization holographic imaging features using deep-learning (DL) models. The analyses show it is effective in identifying and categorizing different types of MP materials. The provided approach introduces a real-time, high-throughput MP analyzer that leverages multidimensional information to enhance the quantification of MPs and provide a reference for treatment strategies. Moreover, the high classification accuracy, robustness, and generalizability of this approach make it a promising tool for future research and practical applications in assessing and managing MP pollution.

MP pollutants have become a global environmental concern, leading to the development and application of various detection methods, including imaging-based, thermal, and chemical analysis techniques. Practical MP detection often requires the use of multiple methods to achieve reliable results. Combining thermal and chemical techniques with imaging-based methods can provide a more comprehensive approach to MP detection. It is highly desirable to identify and quantify MP particles together with their chemical compositions and morphological distributions. In recent years, several emerging imaging techniques have been applied to the field of MP detection. These imaging techniques can provide valuable information for MP identification and analysis and potentially lead to new insights into the distribution and impact of MPs in the environment. For example, a combination of neutron and X-ray tomography has been tested to detect MP particles in sandy sediments. Moreover, flow cytometry (FlowCam) can be used to detect and analyze MPs in water samples, combining high-resolution imaging with flow cytometry to capture images of particles. As more technologies are developed, additional MP features can be acquired. We can further explore the possibility of enhancing the integration of new advanced technologies and the current detection methods for MPs.

However, there are still complex situations for MP analysis. For instance, multiple scattering and absorption exist in real seawater samples that are usually mixed with a lot of impurities, affecting the imaging effect. It has been primarily demonstrated that the imaging system of the present disclosure is capable of seeing through scattering media and obtaining multimodal information about the object. The results suggest that polarization features can substantially improve image contrast even in highly turbid water.

It is an objective of the present invention to provide apparatuses and methods for aquatic microplastic identification with polarized digital holography to solve the aforementioned technical problems.

In accordance with the first aspect of the present invention, an apparatus for aquatic microplastic identification with polarized digital holography is provided. The apparatus includes a laser source, a polarization camera, a sampling channel, a recorder, and a morphology analyzing module. The laser source is configured to provide a laser beam. The polarization camera is positioned under the laser source such that the laser source aligns with the polarization camera to optically couple with the polarization camera for emitting the laser beam to the polarization camera. The polarization camera includes a polarizer mounted in front of the polarization camera so as to optically couple with a camera lens of the polarization camera and to enable the camera lens to obtain images with different polarization states simultaneously. The sampling channel is positioned between the laser source and the polarization camera. The recorder is electrically coupled with the polarization camera, in which the polarization camera is further configured to capture sampling images of MP samples in the sampling channel and transfer them to the recorder. The morphology analyzing module is electrically coupled with the recorder and is configured to access the recorder for real-time tracking and analyzing, so as to classify the MP samples. The morphology analyzing module classifies the MP samples based on interference patterns resulting from superposition of object and reference waves shown from the sampling images.

In accordance with the second aspect of the present invention, an apparatus for aquatic microplastic identification is provided. The apparatus includes a housing, a laser source, a polarization camera, and a microprocessor. The housing has a first room and a second room which are separated from each other to generate a sample channel therebetween. The laser source is disposed within the first room and is configured to emit at least one light beam toward the sample channel. The polarization camera is disposed within the second room, in which the laser source aligns with the polarization camera to optically couple with the polarization camera for emitting the laser beam to the polarization camera. The polarization camera include a polarizer mounted in front of the polarization camera so as to optically couple with a camera lens of the polarization camera and to enable the camera lens to obtain images with different polarization states simultaneously. The microprocessor is electrically coupled with the polarization camera and applies a morphology analyzing module for real-time tracking and analyzing, so as to classify MP samples within the sample channel. The morphology analyzing module classifies the MP samples based on interference patterns resulting from superposition of object and reference waves shown from sampling images captured by the polarization camera.

In accordance with the third aspect of the present invention, a method for aquatic microplastic identification is provided. The method includes steps as follows: emitting a laser beam from a laser source, such that the laser beam passes through a liquid sample with MP samples in a sample channel and then a polarizer and is received by polarization camera; capturing a sample image of the MP samples by the polarization camera, wherein the sample image comprises interference patterns resulting from superposition of object and reference waves; and feeding the interference patterns into a morphology analyzing module for real-time tracking and analyzing by using a lightweight convolutional neural network (CNN) model, so as to classify the MP samples.

BRIEF DESCRIPTION OF THE DRAWINGS

Embodiments of the invention are described in more details hereinafter with reference to the drawings, in which.

DETAILED DESCRIPTION

In the following description, apparatuses and methods for aquatic microplastic identification with polarized digital holography and the likes are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

The investigation of microplastics (MPs) typically involves a multi-stage process in which the particles are gathered using sieves, processed, and ultimately positioned in Petri dishes. Furthermore, the examination and analysis of static MP samples is a labor-intensive process, frequently involving a significant degree of reliance on the operator, as it heavily depends on visual inspection. In contrast, imaging dynamic MPs offers a more efficient method for assessment compared to the time-consuming static MP analysis. However, the light scattering and absorption of suspending particles often result in a veiling effect for underwater imaging, reducing the contrast on holographic fringes. To address this issue, it is to demonstrate a compact polarization holographic device that can analyze MP samples dispersed in water and flowing through a customized glass fluidic channel.

Figure 1:
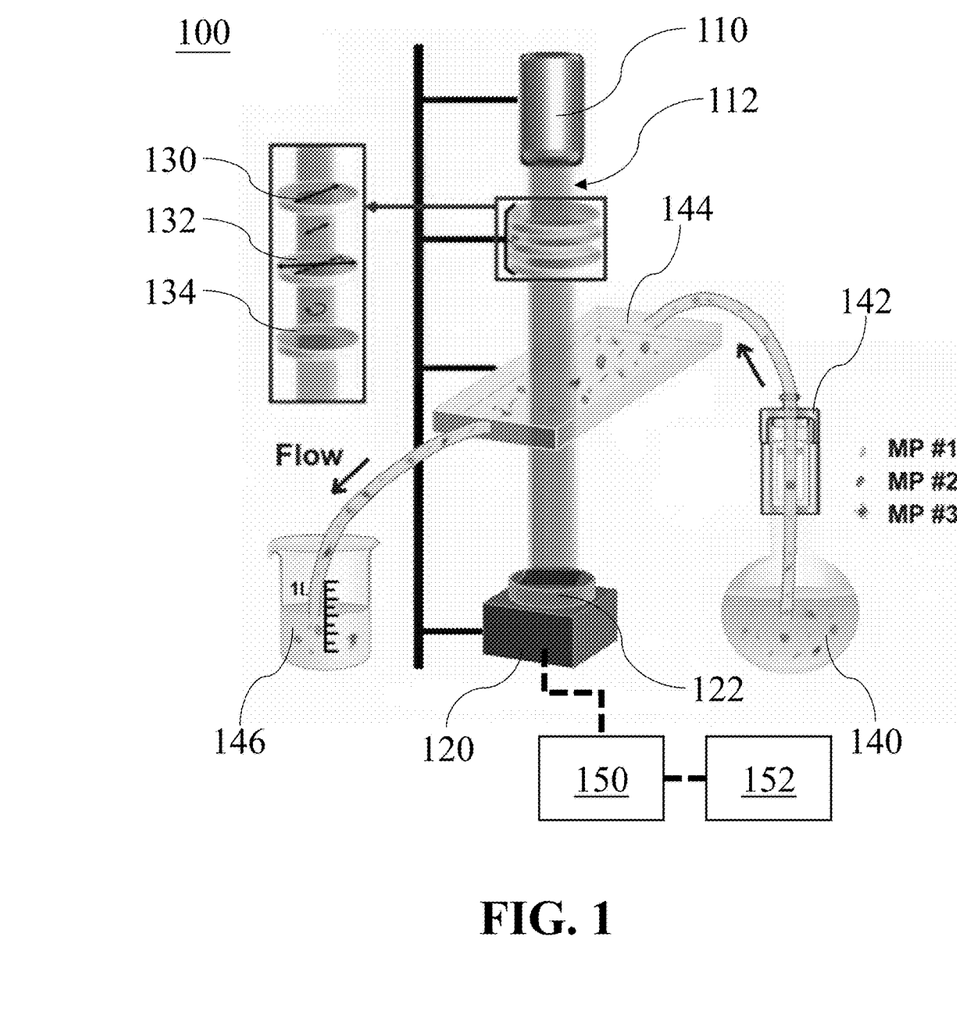
FIG. 1 depicts a schematic stereoscopic view of an apparatus for microplastic identification with polarized digital holography according to one embodiment of the present invention.

FIG. 1 depicts a schematic stereoscopic view of an apparatus 100 for microplastic identification with polarized digital holography according to one embodiment of the present invention. The apparatus 100 includes a laser source 110, a polarization camera 120, a linear polarizer (LP) 130, a quarter-wave plate (QWP) 132, a neutral density filter (NDF) 134, a sample source container 140, a liquid pump 142, a sampling channel 144, a flow collector 146, a recorder 150, and a morphology analyzing module 152. Different MPs, such as MP #1, MP #2, and MP #3 are illustrated in FIG. 1 as well.

The laser source 110 aligns with the polarization camera 120 to optically couple with the polarization camera 120 and is configured to provide/emit a laser beam 112 propagating toward the polarization camera 120. In one embodiment, the laser source 110 provides the laser beam 112 as a continuous wave with a wavelength of approximately 632.8 nm.

The LP 130, the QWP 132, the NDF 134 are positioned between the laser source 110 and the polarization camera 120, in which they are disposed in sequence from the laser source 110 to the polarization camera 120 so are coupled between the laser source 110 and the polarization camera 120. The LP 130 and the QWP 132 can cooperate to generate circularly polarized light for the laser beam 112. The NDF 134 is placed to ensure a suitable light intensity for the circularly polarized light of the laser beam 112. Such the configuration is to provide polarization holographic imaging, which is a non-invasive technique that requires no sample preparation and offers single-shot evaluations, thereby enabling the dynamic collection of data from flowing samples.

The sampling channel 144 is positioned between the laser source 110 and the polarization camera 120, such that the laser beam 112 passing through the LP 130, the QWP 132, the NDF 134 can enter the sampling channel 144. The sampling channel 144 serving as a fluidic channel is made of clear quartz glass with light transmission (e.g., more than 90% or 95%, or set as about 95%). In one embodiment, the sampling channel 144 has dimensions of about 5 mm for inner thickness, about 10 mm for width, and about 50 mm for length. This design prevents any potential disruption to the sample's holographic fringes and is suitable for samples of various sizes.

Two tubes are connected to opposite side surfaces of the sampling channel 144. The first tube connects the sample source container 140 to the sampling channel 144 and is equipped with the liquid pump 142 above the sample source container 140. The sample source container 140 can be filled with sample liquid containing MPs (Microplastics) such as MP #1, MP #2, and MP #3 floating therein. During sampling, the liquid pump 142 can pump the sample liquid from the sample source container 140 into the sampling channel 144 via the tube. The second tube connects the sampling channel 144 to the flow collector 146 for storing the sampled liquid.

Figure 2A:
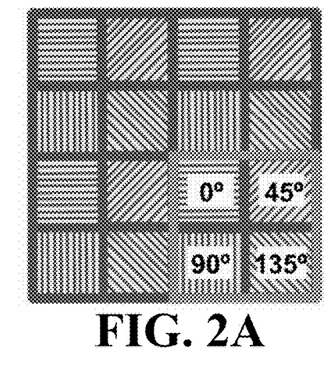
FIG. 2A depicts a schematic front view of a polarizer mounted in front of the polarization camera according to one embodiment of the present invention.
Figure 2B:
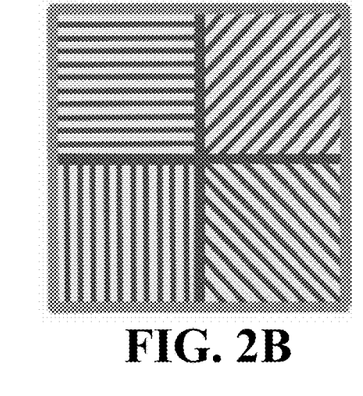
FIG. 2B depicts a schematic front view of an individual calculation unit of the polarizer according to one embodiment of the present invention.

FIG. 2A depicts a schematic front view of a polarizer 122 mounted in front of the polarization camera 120 according to one embodiment of the present invention, and FIG. 2B depicts a schematic front view of an individual calculation unit of the polarizer 122. The highlighted zone in FIG. 2A is enlarged and shown in FIG. 2B to showcase the individual calculation unit of the polarizer 122.

The polarizer 122 is mounted in front of the polarization camera 120 so as to optically couple with a camera lens of the polarization camera 120 and to enable the camera lens to obtain images with different polarization states simultaneously. Specifically, there are four directions representing zones of varied polarization states and further processed accordingly, such that the polarization camera 120 can be employed to simultaneously record holograms with four different polarization states at 0°, 45°, 90°, and 135°, respectively. In one embodiment, the polarizer employs Stokes mask polarizer. With such the configuration, the laser beam 112 is collimated by a convex lens at the laser source 110 and is circularly polarized by the LP 130 and the QWP 132. The fast axis of the QWP 132 is oriented at 45° with respect to that of the polarizer 122.

The recorder 150 is electrically coupled with the polarization camera 120, and the morphology analyzing module 152 is electrically coupled with the recorder 150. Herein, the term "electrically coupling/electrically coupled" encompasses both wired connections (coupled/coupling) and wireless connections (coupled/coupling). For example, when stating that element A is electrically coupled to/with element B, it signifies that element A can communicate with element B, facilitating the transfer or exchange of data or information.

The polarization camera 120 can capture sampling images and transfer them to the recorder 150. By acquiring the images at four different angles, it achieves effectively measurement to all four Stokes parameters, enabling a comprehensive characterization of the polarization state of the scattered light from the MP samples. These polarization states are used to determine the sample optical anisotropy and calculate birefringence-related features (i.e. phase retardance, angle of polarization). Additionally, polarization camera 120 can further register the holographic interference patterns between the light passing through the object and a plane reference wave and transfer them to the recorder 150 for record. In one embodiment, polarization camera 120 and the recorder 150 can cooperate to generate at least one angle of polarization (AoP) image and at least one degree of linear polarization (DoLP) image in response to the images captured by the polarization camera 120.

The morphology analyzing module 152 can access the recorder 150 for real-time tracking and analyzing, so as to segment, measure, and count the MP samples. In one embodiment, a lightweight convolutional neural network (CNN) combined with a Strong-SORT network or/and a YOLO model is applied to the morphology analyzing module 152. For example, a total of 1000 images are captured using the polarization holographic setup, as well as videos with continuous image recording via the above configuration. Each frame of the video is a single hologram, representing the interference pattern resulting from the superposition of object and reference waves. To further support the analysis process, the captured 1000-image dataset is divided into training-validation-test segments with a ratio of 8:1:1. This division of data facilitates the effective training of the deep-learning (DL) model and enables reliable evaluation of its performance, improving the counting and the classifying accuracy for MP samples.

Specifically, optical features resulting from utilizing polarization holographic imaging can be fed into the morphology analyzing module 152, including sample optical anisotropy, birefringence-related features, phase retardance, angle of polarization, holographic interference patterns. As such, the optical features are extracted from the MP samples and are further fed into the morphology analyzing module 152 for training a DL model (e.g., CNN) of the morphology analyzing module 152 based on a classification purposes. In one embodiment, the output images, such as dehazing, are post-processed and further trained in the DL model of the morphology analyzing module 152 for identification and classification. For example, physics-informed deep neural networks are constructed and trained for processing the raw images with descattering and denoising.

Figure 3A:
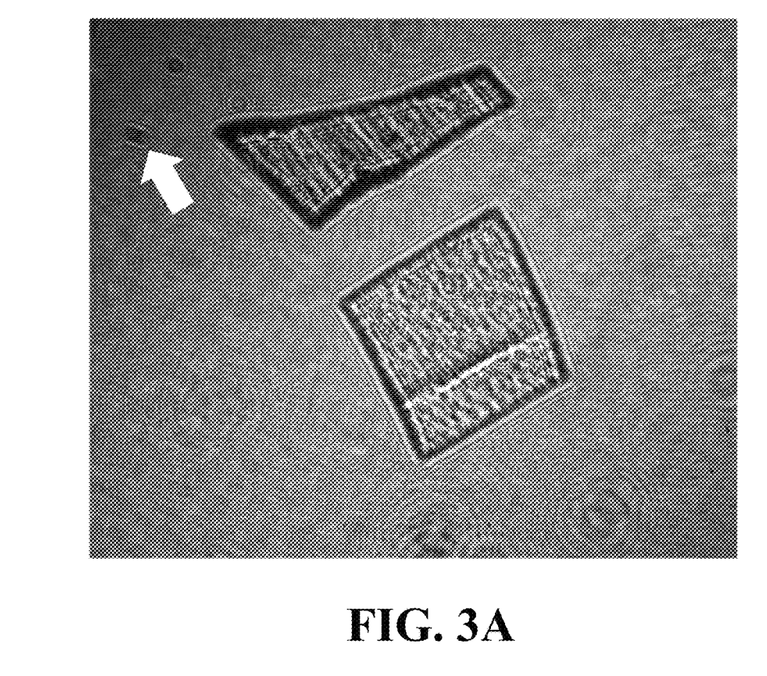
FIG. 3A depicts the intensity holograms of MP sheets in the air environment.
Figure 3B:
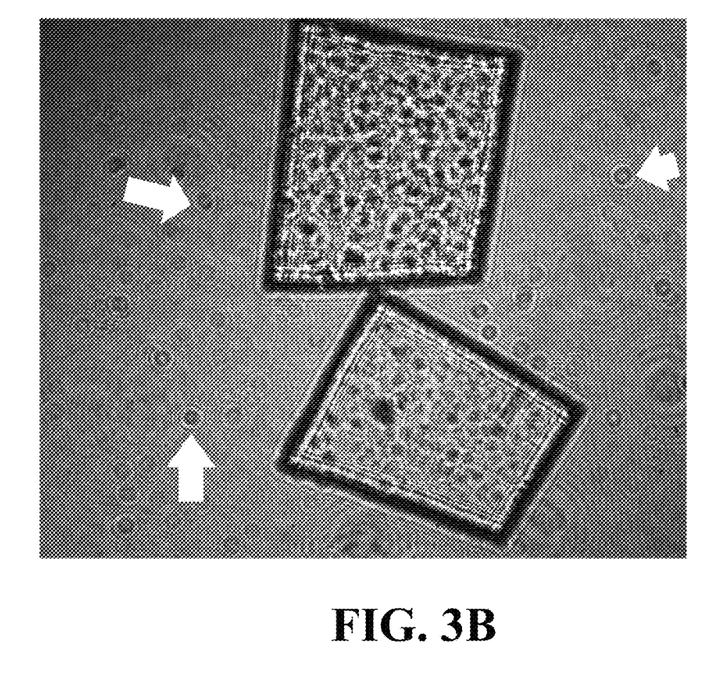
FIG. 3B depicts the intensity holograms of MP sheets in the aquatic environment.

The apparatus 100 is configured to submerge the MP samples in water, which eliminates significant light reflection and scattering issues and aids in real-time classification. The intensity holograms of MP sheets in the air or aquatic environment are shown in FIG. 3A (intensity hologram of MP sheets in the air) and FIG. 3B (intensity hologram of MP sheets in the water). The representative disturbance for imaging in FIG. 3A and FIG. 3B are indicated by arrows. Both samples perform distinguishable holographic patterns, and they can be clearly photographed with the fluidic channel. Although water may result in a disturbance compared with the air environment, it does not significantly drop the recognition performance of the patterns. Fully submerging the sample in water could reduce the interference of surface reflection.

In one embodiment, apparatus 100 can be practically established as the following configuration with experimental setup, calibration, and data collection to achieve polarization holographic imaging for feature capture and fieldwork using a compactly designed system.

A monochromatic laser light source with a wavelength of 632.8 nm is employed. An LP and a QWP are combined to generate a circularly polarized laser beam. An NDF is placed to ensure the light intensity is suitable. The uniformly distributed circularly polarized light then passed through the sample plate and interacted with the samples, encoding the sample feature information with wavefront deformation and polarization state modification. A polarization CMOS camera is used to record polarization-sensitive digital holograms with four different polarization states. The captured image has a resolution of 2464 pixels*2056 pixels. The pixels with size 3.45 μm are arranged in a group of 2*2 grid arrays, which simultaneously capture the polarization states at 0, 45, 90, and 135, respectively. These polarization states are used to calculate birefringence-related features.

To ensure the accuracy and reliability of the system, a calibration process can be implemented. This system calibration encompasses circularly polarized light calibration and lateral resolution calibration, accounting for the impacts of the medium, the sample, and dispersion. A reference sample, such as glass without birefringence, is utilized to calibrate the polarization holographic imaging system. The light intensity distribution at four distinct angles is adjusted to achieve a uniformly circularly polarized light beam, and a non-birefringent glass sample is employed to validate the DoLP parameter. Reference samples are prepared with known physical parameters, including size and shape, under consistent medium and dispersion conditions. Analyzing the reference sample enables the determination of the relationship between the measured optical phase and the established physical parameters. In this system, the calibrated spatial resolution is 20 μm. The examination of the reference sample allows for the estimation of potential errors and uncertainties in the measurements, thereby ensuring the reliability of the obtained results. Sample particle detection in flow is performed using a customized fluidic channel made of 95% light transmission quartz glass. The dimensions of the channel are designed according to the MP size range: 5 mm (inner thickness), 10 mm (width), and 50 mm (length). The flow speed is precisely controlled by a water pump, with a speed control range starting from 2 ml/min and capable of reaching a maximum volume flow rate of 15 ml/min. The optimal speed should be determined according to the sample situation. In some embodiments, the optimized speed is set at 8 ml/min for stable MP movement.

Regarding real-time counting and morphological analysis, In the apparatus 100, the flow rate of water is crucial for accurate fringe recording and sample movement. A water pump is applied to precisely control the speed of water flow. If the system has a high flow rate, it becomes challenging to record fringes precisely. On the other hand, if the system has a low flow rate, the samples struggle to move forward. In one embodiment, the volume flow rate of water is optimized at about 8 ml/min, allowing for stable and high-throughput detection. The apparatus 100 features a microfluidic channel that is capable of reaching a high throughput of 480 mL/h with accurate images. This design enables efficient MP detection in the aqueous environment. Such the optimization ensures that samples of various shapes and materials can be effectively analyzed as they flow through the apparatus 100.

Figure 4:
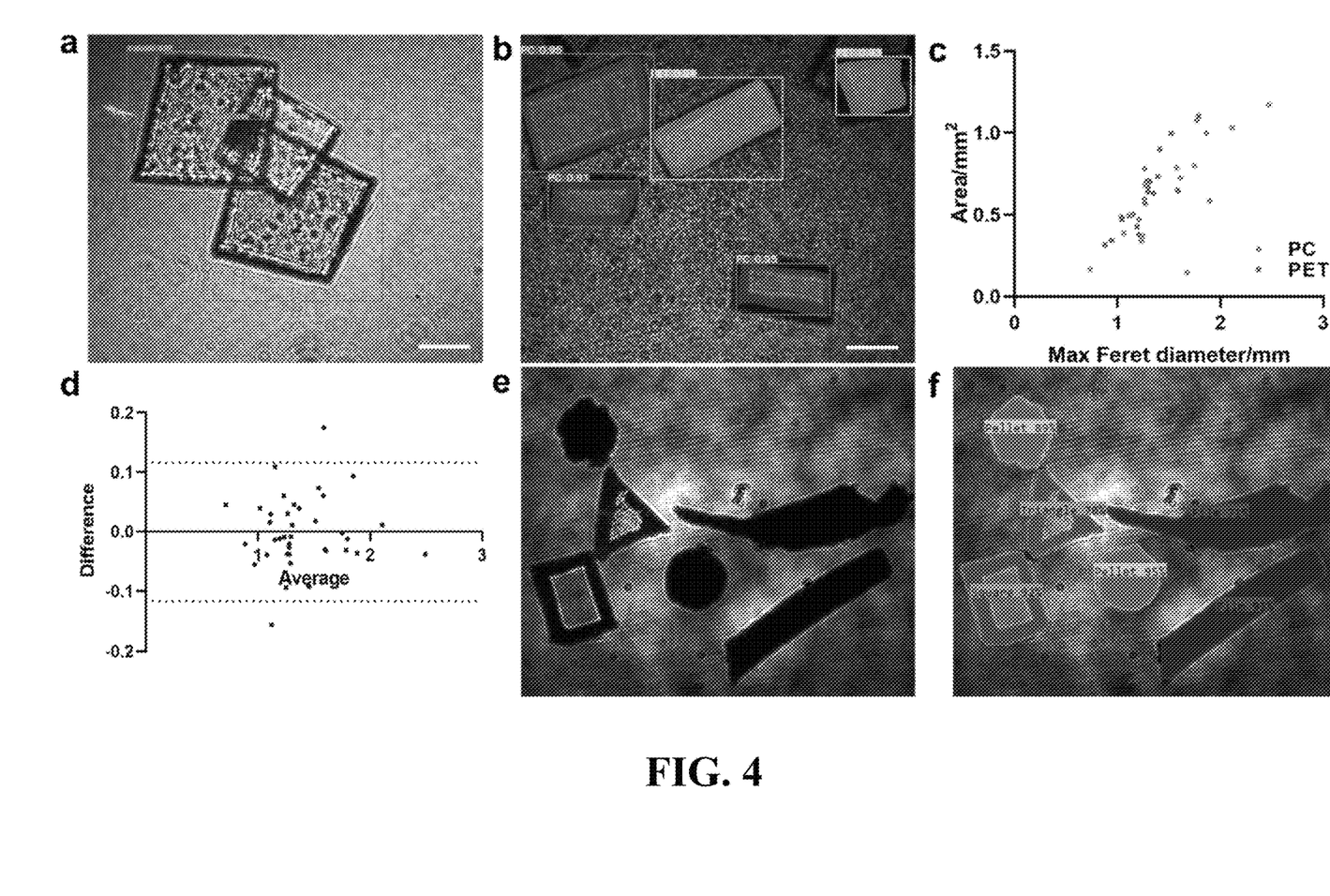
FIG. 4 shows exemplary results of real-time counting and morphological analysis according to one embodiment of the present invention, including section (a): real-time MP counting using the morphology analyzing module 152; section (b): generated masks for two kinds of MPs, PC and PET; section (c): morphological measurement of Max Feret diameter (MFD) and area for PC and PET; section (d): the Bland-Altman analysis comparing the MFD measurements obtained by the estimation and reference values; the dashed lines represent the 95% limits of agreement (LOAs); section (c): mixed MP samples with random shapes and varied degrees of transparency; section (f): classification results of varied shapes shown in section (e)

FIG. 4 shows exemplary results of real-time counting and morphological analysis according to one embodiment of the present invention, including section (a): real-time MP counting using the morphology analyzing module 152; section (b): generated masks for two kinds of MPs, PC and PET; section (c): morphological measurement of Max Feret diameter (MFD) and area for PC and PET; section (d): the Bland-Altman analysis comparing the MFD measurements obtained by the estimation and reference values (n=39); the dashed lines represent the 95% limits of agreement (LOAs); section (e): mixed MP samples with random shapes and varied degrees of transparency; section (f): classification results of varied shapes shown in section (e); the scale bar is 1 mm.

As illustrated in section (a) of FIG. 4, the number of MP samples during a certain time period can be real-time counted. MP morphological analysis is essential for understanding the distribution, characteristics, and potential impacts of these tiny plastic particles on the environment and human health. Individual masks are generated for the identified MP sheets, as shown in section (b) of FIG. 4. The Maximum Feret diameter (MFD, length) and area are employed to measure the samples' morphology and provide valuable information for MP management (see section (c) of FIG. 4). The Feret diameter is a measure of an object's size along a specified direction and can be defined as the distance between the two parallel planes restricting the object perpendicular to that direction. The MFD represents the longest dimension of the samples, and alongside the area, these elements play a crucial role in determining the appropriate filter size for MP filtration. The Bland-Altman method is commonly used to evaluate the agreement between a new tool and the reference standard. Therefore, the Bland-Altman plot shown in section (d) of FIG. 4 is employed to assess the consistency of MFD estimation and reference values (n=39). The majority of data points fell within the 95% limits of agreement (LOAs), demonstrating a standard deviation (SD) of bias equal to 0.05935. Furthermore, the manually cut MP samples are mixed with MP samples collected from an in situ environment, and their shapes were accurately identified based on the generated masks, as shown in sections (e) and (f) of FIG. 4. Both transparent and opaque samples were combined for shape recognition. In addition, note that the provided system of the present invention is primarily used to analyze transparent and translucent samples, and can distinguish samples of different shapes. The shapes of MP samples mainly include fragments, pellets, fibers, films, foam, and beads.

To compensate for the limited spatial resolution of this imaging system, a particle analyzer is used to detect micron-size MP samples with more screening parameters. The particle analyzer is used to analyze ground MPs, enabling high-throughput analysis of the placed samples. As shown in Table 1, micron-scale MP particles are analyzed in multiple dimensions and the mean values are listed as reference data. Circularity measures how closely a shape resembles a perfect circle, which has a circularity value of 1, whereas a highly elongated object approaches a value of 0. The circularity of MPs reflects their interaction with the environment.

TABLE 1

Morphological analysis of CryoMill ground MP particles using particle analyzer Morphologi.

| | Particles | Circularity | SE Volume/$\mu m^3$ | Length/$\mu m$ | Width/$\mu m$ | Max diameter/$\mu m$ |
|---|---|---|---|---|---|---|
| PC  | 1515 | 0.856 | $1.69e^6$ | 57.41 | 34.97 | 921.59 |
| PET | 2899 | 0.901 | $7.42e^5$ | 36.62 | 24.01 | 560.44 |
| PP  | 2949 | 0.899 | $2.78e^5$ | 20.38 | 12.55 | 569.44 |
| PS  | 2559 | 0.883 | $3.69e^5$ | 43.72 | 28.62 | 402.35 |
| PVC |  930 | 0.854 | $1.14e^6$ | 58.67 | 37.49 | 550.52 |

Material classification by polarization holographic features is described as follows.

In one embodiment, the analysis is for samples including six types of transparent and colorless plastic materials commonly used in consumer goods production: polycarbonate (PC), polyethylene terephthalate (PET), polyvinyl chloride (PVC), polypropylene (PP), polystyrene (PS), and polymethyl methacrylate (PMMA). These samples are manually cut into small fragments with a size below 5 mm and are difficult to distinguish with the naked eye. Additional materials such as glass, lens paper, and algae are included in the control group to enrich sample diversity. Glass, typically an amorphous solid with no long-range crystal structure, is not birefringent under normal conditions, making it a suitable reference. Meanwhile, different plastic products exhibit varying degrees of birefringence, which allows for material distinction.

Figure 5A:
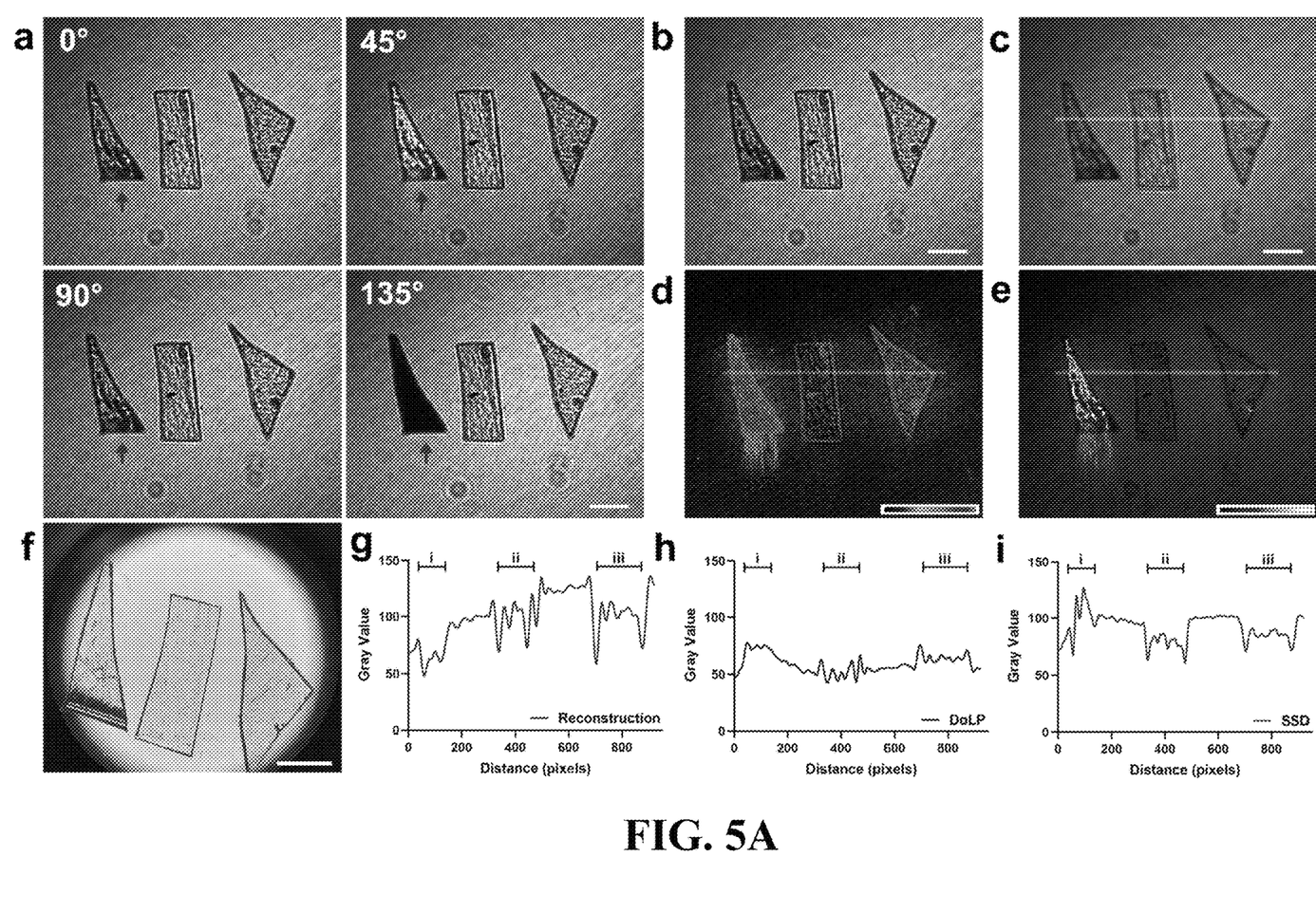
FIG. 5A shows exemplary results of real-time counting and morphological analysis according to one embodiment of the present invention, including: section (a): representative polarized digital holograms at four angles; section (b): processed intensity holograms of identical samples; section (c): holographic reconstruction of section (b); section (d): degree of linear polarization (DoLP) features of MP sheets; section (e): the stack standard deviation (SSD) image illustrates the birefringence-related features; section (f): microscope image of MP sheets: section (g): intensity value distribution derived from (c); section (h): DoLP value distribution obtained from section (d); section (i): SSD value distribution extracted from section (e)

FIG. 5A shows exemplary results of real-time counting and morphological analysis according to one embodiment of the present invention, including: section (a): representative polarized digital holograms at four angles; section (b): processed intensity holograms of identical samples; section (c): holographic reconstruction of section (b); section (d): degree of linear polarization (DoLP) features of MP sheets; section (e): the stack standard deviation (SSD) image illustrates the birefringence-related features; section (f): microscope image of MP sheets: section (g): intensity value distribution derived from (c); section (h): DoLP value distribution obtained from section (d); section (i): SSD value distribution extracted from section (e); scale bar is 1 mm.

The samples are imaged by a stereo microscope and compared with polarized holograms. The intensity differences in the four-angle images, as shown in section (a) of FIG. 5A, indicate their optical anisotropy, which is helpful for material discrimination. The intensity of the MP sheet "I" with strong birefringence as indicated by the arrows changes significantly in four images compared with the other two MP sheets, "II" and "III". Holographic fringes of different patterns are displayed in section (b) of FIG. 5A. As the complex light field is encoded in the holograms, the imaging system provided by the apparatus 100 can numerically reconstruct them, as shown in section (c) of FIG. 5A. The reconstructed image exhibits a minor distinction from the original holograms in terms of morphological measurements and material identification. To facilitate real-time MP tracking and efficient measurement, the numerical reconstruction is omitted in subsequent descriptions.

MP material classification plays a crucial role in understanding the distribution and potential impacts of these contaminants on the environment. Some plastic materials are optically anisotropic and exhibit birefringence. Birefringence refers to the optical characteristic of a material having a refractive index that depends on the polarization and propagation direction of light. The six kinds of samples are all transparent polymers but vary in birefringence. Plastic sheets with anisotropy can alter the polarization state of transmitted light at different angles, and also influence the polarization parameters such as the degree of linear polarization (DoLP) as shown in section (d) of FIG. 5A. Moreover, the MP sheets with higher anisotropy show significant intensity changes at different angles, consistent with their respective birefringence values. The four images are quantified as total input, and the stack standard deviation (SSD) is used to demonstrate the birefringence difference for further training and identification, as presented in section (e) of FIG. 5A. Meanwhile, section (f) of FIG. 5A presents a stereo microscope image of six samples, which are difficult to distinguish when they are transparent. Additionally, line profiles of the holographic reconstruction, DoLP, and SSD are measured accordingly, demonstrating that DoLP and SSD measurements make it easier to distinguish materials with birefringence (see sections (g), (h), (i) of FIG. 5A).

Figure 5B:
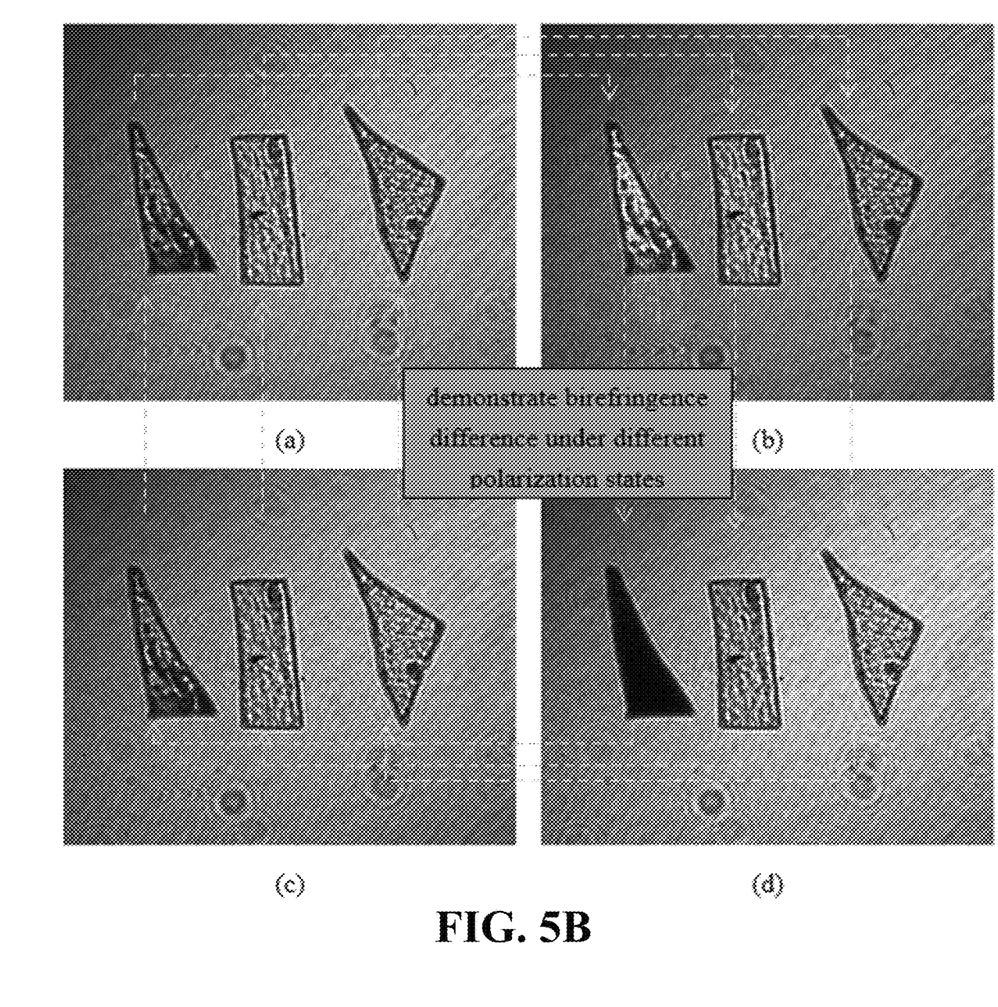
FIG. 5B shows birefringence value and intrinsic birefringence value with four polarization states: section (a) 0°; section (b) 45°; section (c) 90°; section (d) 135°.

Further, birefringence value ($\Delta n$) and intrinsic birefringence value ($\Delta n_0$) are shown in FIG. 5B, which is sample image demonstration for the birefringence value variances with four polarization states: section (a) 0°; section (b) 45°; section (c) 90°; section (d) 135°. Referring to FIG. 5B, dramatic differences in the form of birefringence values are shown among images with different polarization states.

Figure 6:
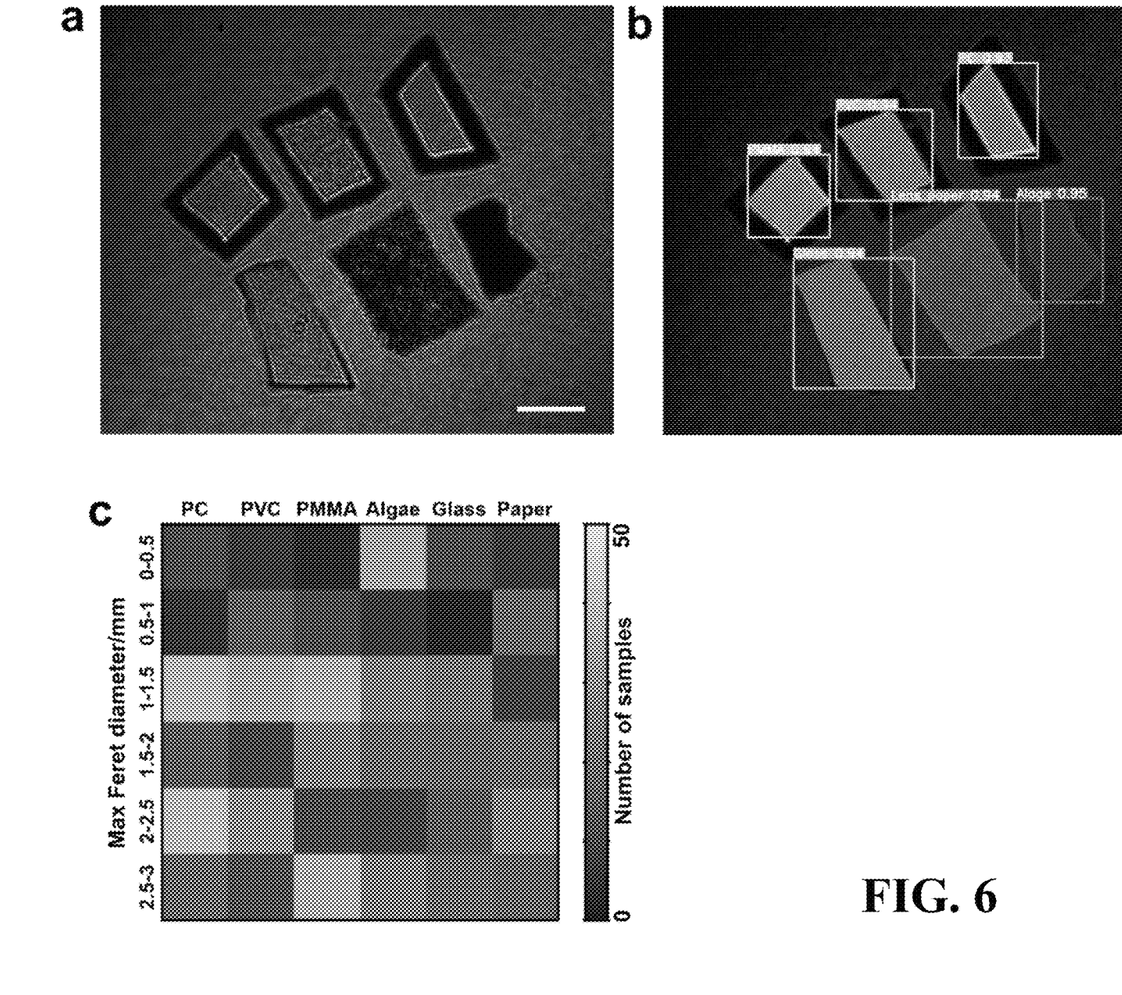
FIG. 6 shows exemplary results of real-time counting and morphological analysis according to one embodiment of the present invention, including section (a): intensity images of six types of MP samples; section (b): sample identification results based on polarization holographic features; section (c): heatmap indicating the number of samples in different sizes and material groups.

FIG. 6 shows exemplary results of real-time counting and morphological analysis according to one embodiment of the present invention, including section (a): intensity images of six types of MP samples; section (b): sample identification results based on polarization holographic features; section (c): heatmap indicating the number of samples in different sizes and material groups; scale bar: 1 mm. As aforementioned, by utilizing polarization holographic imaging of the apparatus 100, the unique features from the MP samples can be extracted to train the DL model for classification purposes. The images of six types of samples are shown in section (a) of FIG. 6 and further classified, corresponding to the SSD in section (b) of FIG. 6. This classification helps assess the fate and transport of MPs in the environment. Furthermore, determining the material composition enables the development of targeted management strategies to reduce the release of specific MP types, ultimately mitigating their environmental impacts. A comprehensive heatmap is generated to visualize the distribution of MPs in the samples, illustrating the number of MPs in different size ranges and material types, as shown in section (c) of FIG. 6. This heatmap provides a clear overview of the MP distribution and allows for a better understanding of the filtration requirements for different materials and sizes.

Comparisons of results with Raman spectra are provided below.

A single imaging method often proves insufficient for accurately and reliably identifying MPs, as they can vary widely in size, shape, and polymer composition, particularly when embedded in complex environmental matrices. To overcome these limitations, a combination of two or more analytical techniques is often employed. Typically, physical characterization is coupled with chemical characterization, such as spectroscopy, to produce a comprehensive analysis.

Raman spectroscopy imaging has proven to be particularly valuable in the study of MPs, as it allows for the accurate identification and classification of various polymer types based on their unique spectral signatures and molecular composition. Raman spectroscopy has been considered the ground truth for MP detection, as it provides the identification of multiple characteristic peaks. These peaks represent the current state of the atomic structure and Raman reaction and can be used as a reference for polarization holographic image features.

Figure 7:
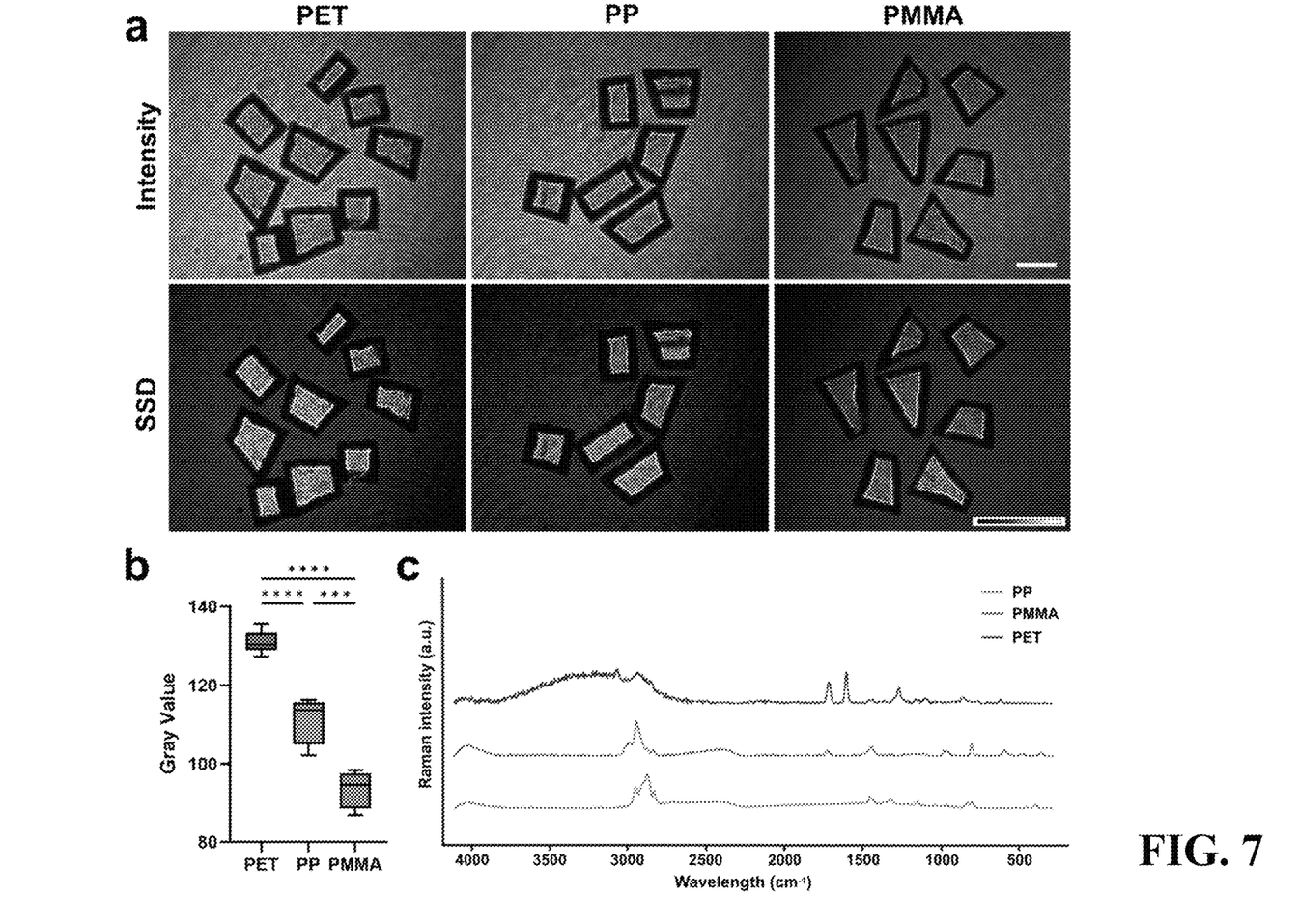
FIG. 7 shows exemplary results of real-time counting and morphological analysis according to one embodiment of the present invention, including section (a): representative MP sheets and their imaging features; section (b): the mean value distribution of measured SSD groups, displaying statistically significant differences; section (c): Raman spectra of representative MP sheets.

FIG. 7 shows exemplary results of real-time counting and morphological analysis according to one embodiment of the present invention, including section (a): representative MP sheets and their imaging features; section (b): the mean value distribution of measured SSD groups, displaying statistically significant differences (n=3); section (c): Raman spectra of representative MP sheets; scale bar: 1 mm.

The identified MP material results are compared with their corresponding Raman spectra, as shown in FIG. 7. The intensity images for three distinct types of MPs and their corresponding SSD feature images effectively demonstrate the variations in birefringence among them (see section (a) of FIG. 7). Section (b) of FIG. 7 shows the mean value distribution of measured SSD groups for three representative types of MP samples. The related spectra are consistent with each other, which further supports the conclusions about correct identification (see section (c) of FIG. 7). Moreover, further investigation may be required to fully understand the mapping relationship between the polarization holographic patterns and the Raman spectrum features.

Discussions for "generation of digital holograms and reconstruction" and "polarization holographic feature analysis" are further provided as follows, which can further support or explain how the apparatus 100 works.

Generation of Digital Holograms and Reconstruction

In a typical digital holography system, the formation of the holographic fringe pattern is achieved by the spatial superposition of the complex reference wave ($U_R$) and object wave ($U_O$). $U_R$ and $U_O$ are initially plane waves. A wavefront deformation is introduced in $U_O$ with the reflection, transmission, and scattering from the object. A photodetector such as a charge-coupled device (CCD) or complementary metal-oxide-semiconductor (CMOS) camera is used to record the intensity distribution (I(x, y)) of the resulting holographic patterns.

$$I = |U_R + U_O|^2 = |U_R|^2 + |U_O|^2 + U_O^* U_R + U_O U_R^*, \quad (1)$$

where * denotes the complex conjugate of the referring part. The spatial coordinates (x, y) are omitted in the equation for clarity. The first two parts of the result are the DC-terms and acting as noise. DC-terms can be limited by applying a numerical filter in the frequency domain or subtracting the mean intensity values. The third and fourth terms are the generated interference patterns. The last term will be considered for further modulation and reconstruction.

Numerical reconstruction of holograms is employed to decode the complex wavefront encoded in the captured holograms, revealing the distributions of amplitude and phase at any desired depth. This process facilitates the extraction of valuable information about the sample, including its morphological characteristics. The angular spectrum function, a widely used method, is applied to calculate the forward or backward propagation of light, allowing for the reconstruction of images across various focal planes. This function is mathematically expressed as:

$$\Gamma(x, y, z) = F^{-1}\left\{F[E_R^*](x, y)h(x, y) * \exp\left(-i\frac{2\pi z}{\lambda}\right)\sqrt{1 - \lambda^2 f_x^2 - \lambda^2 f_y^2}\right\}, \quad (2)$$

where $\Gamma(x, y, z)$ represents the reconstructed complex wavefront with coordinates (x, y, z), F denotes the Fourier transform, $E_R^*$ is the complex conjugate of the reference wave, h is the captured hologram, $\lambda$ is the wavelength of illumination light, and $f_x$ and $f_y$ are the transverse spatial frequencies.

Polarization Holographic Feature Analysis

Holograms at four different angles are simultaneously recorded to obtain a comprehensive characterization of the polarization states of the MP samples. The intensity differences in the four-angle images indicate their optical anisotropy, which is beneficial for material classification. To facilitate material classification, the SSD of four polarized angle images is calculated to facilitate material classification.

By acquiring images at four distinct angles, Stokes parameters can be effectively measured, enabling a complete analysis of the polarization state. Moreover, the polarization states of light are characterized using Linear Stokes parameters as follows:

$$I(x, y) = I^0(x, y) + I^{90}(x, y), \quad (3)$$

$$Q(x, y) = I^0(x, y) - I^{90}(x, y), \quad (4)$$

$$U(x, y) = I^{45}(x, y) - I^{135}(x, y), \quad (5)$$

where I represents the grayscale intensity of a hologram at a certain polarization angle.

Moreover, specific polarization parameters are derived from the captured holographic images based on Stokes parameters to characterize the polarization response of MP sheet samples, such as the degree of linear polarization (DoLP∈[0, 1]):

$$DoLP(x, y) = \frac{\sqrt{Q^2(x, y) + U^2(x, y)}}{I(x, y)}, \quad (6)$$

and the angle of polarization (AoP∈[−π/4, +π/4]):

$$AoP(x, y) = \frac{1}{2}\arctan\frac{U(x, y)}{Q(x, y)}, \quad (7)$$

The DoLP represents the magnitude of the linear polarization state, while the AoP indicates the orientation of the polarization state. Furthermore, both DoLP and AoP are independent of particle geometrical parameters, such as shape, area, size, and perimeter, and remain consistent across a wide range of reconstruction distances. This information is crucial for the reliable identification and quantification of MPs.

Further, regarding sample preparation and image processing, in the present disclosure, six different types of MP sheets are applied: PC, PET, PVC, PP, PS, and PMMA. The samples are imaged using a stereo microscope with a digital camera. The captured MP images by the polarization CMOS camera are accurately labeled using ImageJ, and the dataset is divided into training, validation, and test sets at a ratio of 8:1:1. The YOLO model, a lightweight CNN, is combined with a Strong-SORT network to segment, measure, and count the MP samples. The DL model is available for further fine-tuning.

Figure 8:
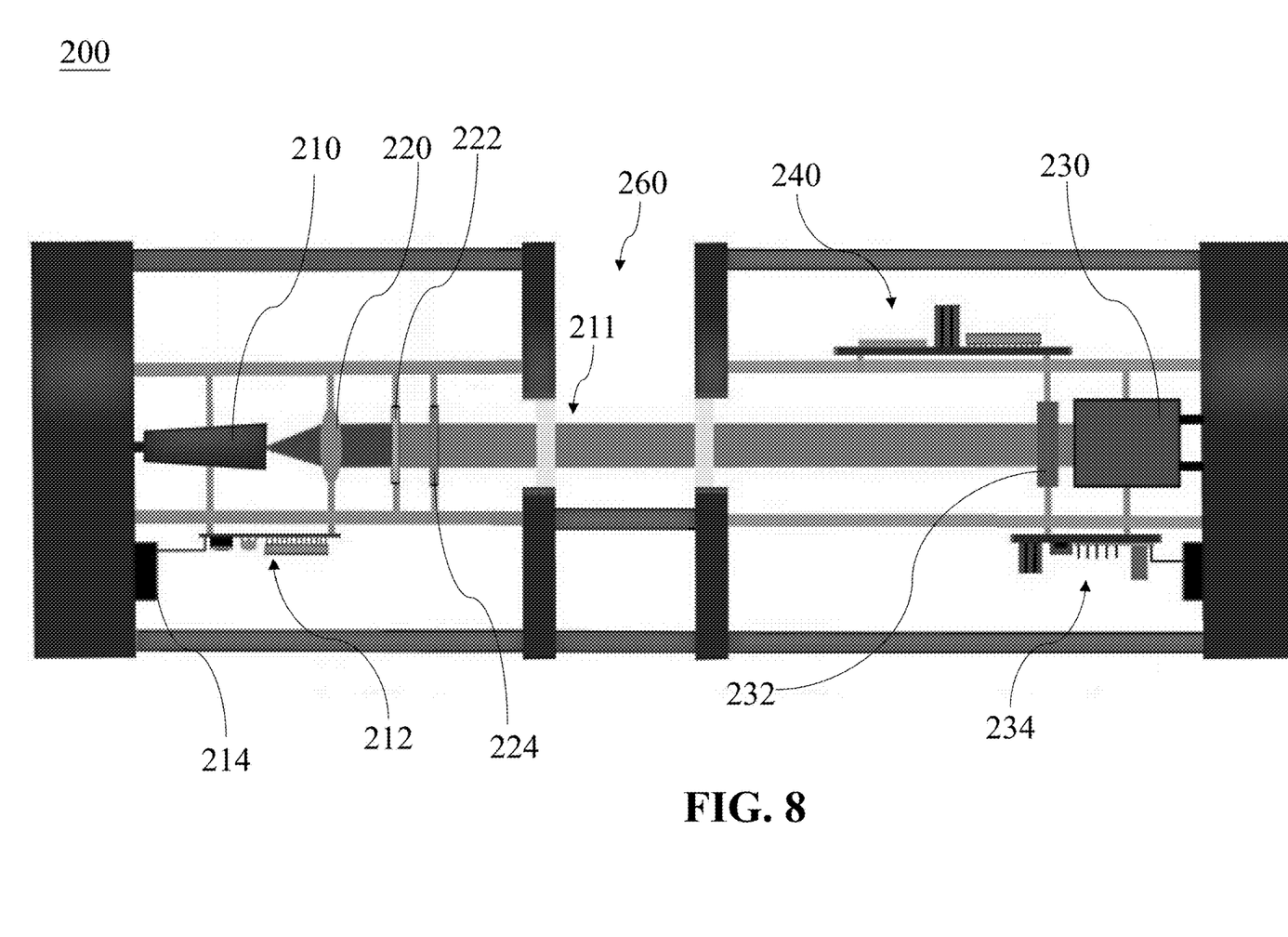
FIG. 8 depicts an amphibious digital holographic apparatus in accordance with some embodiments of the present invention.

FIG. 8 depicts an amphibious digital holographic apparatus 200 in accordance with some embodiments of the present invention. Herein, the detailed parts of the holographic apparatus 200 are demonstrated in FIG. 8, and the individual modules are described. The configuration of the apparatus 100 can be applied to the amphibious digital holographic apparatus 200.

The illustration of FIG. 8 displays a slice of the submersible design to showcase the architecture of the amphibious digital holographic apparatus 200 and the inside components. The apparatus 200 includes a laser source 210, a laser driver 212, a battery module 214, a lens 220, a filter 222, a QWP 224, a polarization camera 230, a microprocessor 234, and a power management module 240. The laser source 210 can be driven by the laser driver 212 and is configured to generate a laser beam (e.g., 532 nm) and further to collimate and attenuate the same.

A polarizer 232 can be placed in front of the polarization camera 230 to detect the polarization states of samples, as afore-described. With respect to the power of the apparatus 200, the battery module 214 is applied by using an internal lithium-ion polymer (LiPo) battery, and the power is regulated by the uninterruptible power management module 240. The battery module 214 can supply an uninterruptible energy source for underwater data and sensory acquisition. In one embodiment, the estimated duration for the longest underwater investigation can last three hours.

With respect to the optical system of the apparatus 200: the digital holographic optical system is established by a coherence light source and a sample channel. The light beam 211 is generated by a 532 nm laser diode, further collimated, and attenuated by the lens 220 and the filter 222, such as optical attenuation plate. The QWP is arranged for the reason as afore-mentioned. The laser beam 211 is of high temporal and spatial coherence. A sample channel 260 is an open space where ocean-water samples can flow freely when the apparatus 200 is immersed underwater. The imaging process is continuous, which is critical for realizing the high-throughput monitoring and analysis of volumetric flow. Furthermore, microplastic samples in the water environment will also be sensed and imaged accordingly.

With respect to the hardware electronics of the apparatus: the onboard microprocessor 234 is paired with the polarization camera 230. The polarization camera 230 can be equipped with a sensor that is capable of a 2464*2056 pixel resolution at about 163 FPS. The captured holographic images are shown with different polarization states (0, 45, 90, and 135-degree polarized states), as afore-described. In addition, AoP images and DoLP images are generated simultaneously. The output images, such as dehazing, are post-processed and further trained in the deep learning model of the microprocessor 234 for identification and classification, as afore-described. For example, the morphology analyzing module 150 can be applied to the microprocessor 234.

With respect to the enclosure of the apparatus 200: the mechanical enclosure consists of acrylic tubing for both enclosures (laser and camera), and the device is well-scaled and equipped with leak-proof parts.

Moreover, the apparatus 200 has a housing with a first room and a second room which are separated from each other to generate the sample channel 260 therebetween. The laser source 210, the laser driver 212, the battery module 214, the lens 220, the filter 222, the QWP 224 can be disposed within the first room. The polarization camera 230, the microprocessor 234, and the power management module 240 can be disposed within the second room.

The portable holographic apparatus can reduce the overall sample screening time, since in situ sample collection, measurements, and analysis can be performed, while all the time-consuming processes of sample treatment, transportation to equipped labs or facilities, and lab experiments can be avoided.

As discussed above, the technical advantages for automatic microplastic detection of the present invention are provided as follows.

Compared to existing MP analysis methods or devices in the lab, such as Raman spectroscopy and Fourier transform infrared spectroscopy, the present invention is capable of identifying MPs in the real environment without any complicated sample preparation.

Compared to existing holographic imaging devices, the combination of holographic imaging with polarized imaging in this invention can help to improve image quality. The polarization information embedded in the holographic data can also provide more useful features for MP detection and classification. In addition, to avoid complicated and time-consuming feature engineering, the holographic data is directly processed for MP identification. The employed DL-based methods can help to classify MPs with high computational efficiency and high accuracy.

The present invention can achieve high image quality through: i) a systematic phenomenological modeling of light scattering and incorporation in the inverse imaging formulation. For example, polarized imaging is used to capture the polarization states of the light field, which is helpful to filter out the scattering light from the background. ii) solving inverse imaging by combining physics-based and learning-driven approaches. For example, physics-informed deep neural networks are constructed and trained for processing the raw images with descattering and denoising.

Holographic imaging captures the optical wavefront, and with proper reconstruction methods, can lead to 3D imaging with flexible focusing so that the particle properties, including both amplitude and phase change can be extracted from the captured holographic data. Then, supervised and unsupervised learning approaches are developed to classify MPs according to their physical properties extracted from holographic imaging and polarized imaging. The apparatus/system is relatively simple and portable. Automatic and high throughput counting and classification of MPs can be realized without any sample preparation or manual visual inspection.

The functional units and modules of the apparatuses, systems, and/or methods in accordance with the embodiments disclosed herein may be implemented using computing devices, computer processors, or electronic circuitries including but not limited to application specific integrated circuits (ASIC), field programmable gate arrays (FPGA), microcontrollers, and other programmable logic devices configured or programmed according to the teachings of the present disclosure. Computer instructions or software codes running in the computing devices, computer processors, or programmable logic devices can readily be prepared by practitioners skilled in the software or electronic art based on the teachings of the present disclosure.

All or portions of the methods in accordance with the embodiments may be executed in one or more computing devices including server computers, personal computers, laptop computers, and mobile computing devices such as smartphones and tablet computers.

The embodiments may include computer storage media, transient and non-transient memory devices having computer instructions or software codes stored therein, which can be used to program or configure the computing devices, computer processors, or electronic circuitries to perform any of the processes of the present invention. The storage media, transient and non-transient memory devices can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

Each of the functional units and modules in accordance with various embodiments also may be implemented in distributed computing environments and/or Cloud computing environments, wherein the whole or portions of machine instructions are executed in distributed fashion by one or more processing devices interconnected by a communication network, such as an intranet, Wide Area Network (WAN), Local Area Network (LAN), the Internet, and other forms of data transmission medium.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated.

What is claimed is:

1. An apparatus for aquatic microplastic identification with polarized digital holography, comprising:
    a laser source configured to provide a laser beam;
    a polarization camera positioned under the laser source such that the laser source aligns with the polarization camera to optically couple with the polarization camera for emitting the laser beam to the polarization camera, wherein the polarization camera comprises a polarizer mounted in front of the polarization camera so as to optically couple with a camera lens of the polarization camera and to enable the camera lens to obtain images with different polarization states simultaneously;
    a sampling channel positioned between the laser source and the polarization camera;
    a recorder electrically coupled with the polarization camera, wherein the polarization camera is further configured to capture sampling images of microplastic (MP) samples in the sampling channel and transfer them to the recorder; and
    a morphology analyzing module electrically coupled with the recorder and configured to access the recorder for real-time tracking and analyzing, so as to classify the MP samples, wherein the morphology analyzing module classifies the MP samples based on interference patterns resulting from superposition of object and reference waves shown from the sampling images.

2. The apparatus of claim 1, wherein classification performed by the morphology analyzing module on the MP samples involves segmenting, measuring, and counting the MP samples.

3. The apparatus of claim 1, wherein the polarizer has four directions representing zones of varied polarization states with four different polarization states at 0°, 45°, 90°, and 135°, respectively.

4. The apparatus of claim 3, wherein the polarizer employs a stokes mask polarizer.

5. The apparatus of claim 1, further comprising:
    a linear polarizer and a quarter-wave plate positioned between the laser source and the polarization camera and thus optically coupled between the laser source and the polarization camera, wherein the linear polarizer and a quarter-wave plate are configured to cooperate to generate circularly polarized light for the laser beam.

6. The apparatus of claim 5, further comprising:
    a neutral density filter positioned between the quarter-wave plate and the polarization camera and thus optically coupled between the laser source and the polarization camera, wherein the neutral density filter is configured to ensure a suitable light intensity for the circularly polarized light of the laser beam.

7. The apparatus of claim 1, further comprising two tubes connected to opposite side surfaces of the sampling channel for facilitating an inflow and outflow of liquid in the sampling channel.

8. The apparatus of claim 7, further comprising a
    a liquid pump configured to transfer a sample liquid containing the MP samples from a sample source container into the sampling channel via one of the tubes and to regulate a flow rate of the sample liquid at 8 ml/min.

9. The apparatus of claim 8, wherein the sampling channel serves as a fluidic channel made of clear quartz glass with light transmission.

10. The apparatus of claim 1, wherein the morphology analyzing module comprises a lightweight convolutional neural network (CNN) model.

11. An apparatus for aquatic microplastic identification, comprising:
    a housing having a first room and a second room which are separated from each other to generate a sample channel therebetween;
    a laser source disposed within the first room and configured to emit at least one light beam toward the sample channel;
    a polarization camera disposed within the second room, wherein the laser source aligns with the polarization camera to optically couple with the polarization camera for emitting the laser beam to the polarization camera, and wherein the polarization camera comprises a polarizer mounted in front of the polarization camera so as to optically couple with a camera lens of the polarization camera and to enable the camera lens to obtain images with different polarization states simultaneously; and
    a microprocessor electrically coupled with the polarization camera and applying a morphology analyzing module for real-time tracking and analyzing, so as to classify MP samples within the sample channel, wherein the morphology analyzing module classifies the MP samples based on interference patterns resulting from superposition of object and reference waves shown from sampling images captured by the polarization camera.

12. The apparatus of claim 11, further comprising a lens disposed within the first room and optically coupled between the laser source and the polarization camera, wherein the lens is configured to collimate the light beam before the light beam passing through the sample channel.

13. The apparatus of claim 11, wherein classification performed by the morphology analyzing module of the microprocessor on the MP samples involves segmenting, measuring, and counting the MP samples.

14. The apparatus of claim 11, wherein the polarizer has four directions representing zones of varied polarization states with four different polarization states at 0°, 45°, 90°, and 135°, respectively.

15. The apparatus of claim 14, wherein the polarizer employs a stokes mask polarizer.

16. The apparatus of claim 11, wherein the morphology analyzing module of the microprocessor comprises a lightweight convolutional neural network (CNN) model.

17. The apparatus of claim 1, wherein the microprocessor is further configured to generate at least one angle of polarization (AoP) image and at least one degree of linear polarization (DoLP) image in response to the images captured by the polarization camera.

18. A method for aquatic microplastic identification, comprising:
    emitting a laser beam from a laser source, such that the laser beam passes through a liquid sample with MP samples in a sample channel and then a polarizer and is received by polarization camera;
    capturing a sample image of the MP samples by the polarization camera, wherein the sample image comprises interference patterns resulting from superposition of object and reference waves; and
    feeding the interference patterns into a morphology analyzing module for real-time tracking and analyzing by using a lightweight convolutional neural network (CNN) model, so as to classify the MP samples.

19. The method of claim 18, wherein classification performed by the morphology analyzing module of the microprocessor on the MP samples involves segmenting, measuring, and counting the MP samples.

20. The apparatus of claim 18, wherein the polarizer has four directions representing zones of varied polarization states with four different polarization states at 0°, 45°, 90°, and 135°, respectively.

* * * * *